United States Patent
Greenleaf et al.

(10) Patent No.: US 8,244,415 B1
(45) Date of Patent: Aug. 14, 2012

(54) OBJECT REPRESENTATION OF SENSOR DATA

(75) Inventors: William T. Greenleaf, Indialantic, FL (US); Andrew M. Vesel, Indialantic, FL (US); Steve J. Nieuwsma, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 347 days.

(21) Appl. No.: 12/566,900

(22) Filed: Sep. 25, 2009

(51) Int. Cl.
 *G01C 23/00* (2006.01)
(52) U.S. Cl. .......................................................... 701/3
(58) Field of Classification Search .................. None
 See application file for complete search history.

(56) References Cited

U.S. PATENT DOCUMENTS

| | | | |
|---|---|---|---|
| 6,012,675 A * | 1/2000 | Cocatre-Zilgien | 244/16 |
| 7,188,042 B2 * | 3/2007 | Havens | 702/116 |
| 2004/0220739 A1 * | 11/2004 | Root et al. | 702/3 |
| 2005/0232512 A1 * | 10/2005 | Luk et al. | 382/276 |
| 2009/0043486 A1 * | 2/2009 | Yang et al. | 701/117 |
| 2010/0030716 A1 * | 2/2010 | Calise et al. | 706/23 |
| 2010/0235132 A1 * | 9/2010 | Havens | 702/116 |

* cited by examiner

*Primary Examiner* — Thomas Tarcza
*Assistant Examiner* — Nagi Murshed
(74) *Attorney, Agent, or Firm* — Donna P. Suchy; Daniel M. Barbieri

(57) ABSTRACT

Aircraft operating environment information is sensed. The aircraft operating environment information is encapsulated in at least one sensor object. The at least one sensor object is transferred to a sensor object processing system. The at least one sensor object is processed.

18 Claims, 2 Drawing Sheets

OBJECT REPRESENTATION OF SENSOR DATA

TECHNICAL FIELD

The present disclosure generally relates to the field of aviation, and more particularly to a system, method, and product for transferring sensor data for an aircraft.

BACKGROUND

Electronic sensors sense aircraft operating environment information. Aircraft flight deck systems receive this aircraft operating environment information from the sensors. This information is shown on flight deck displays for the benefit of the user. The information not currently shown on the flight deck displays is discarded, not measured, or not transferred to the flight deck system.

SUMMARY

A method includes, but is not limited to: sensing aircraft operating environment information; encapsulating the aircraft operating environment information in at least one sensor object; transferring the at least one sensor object to a sensor object processing system; and processing the at least one sensor object.

A system includes, but is not limited to: means for sensing aircraft operating environment information; means for encapsulating the aircraft operating environment information in at least one sensor object; means for transferring the at least one sensor object to a sensor object processing system; and means for processing the at least one sensor object.

An information handling device includes, but is not limited to: a plurality of sensors for sensing aircraft operating environment information and encapsulating the aircraft operating environment information in at least one sensor object; a memory for storing the at least one sensor object; a processor for loading the at least one sensor object into the memory from the plurality of sensors and calculating flight information via the at least one sensor object; a display for receiving the flight information from the processor and presenting the flight information to a user; and a bus communicatively coupling the processor, the plurality of sensors, the processor, the display, and the memory.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

Figure 1:
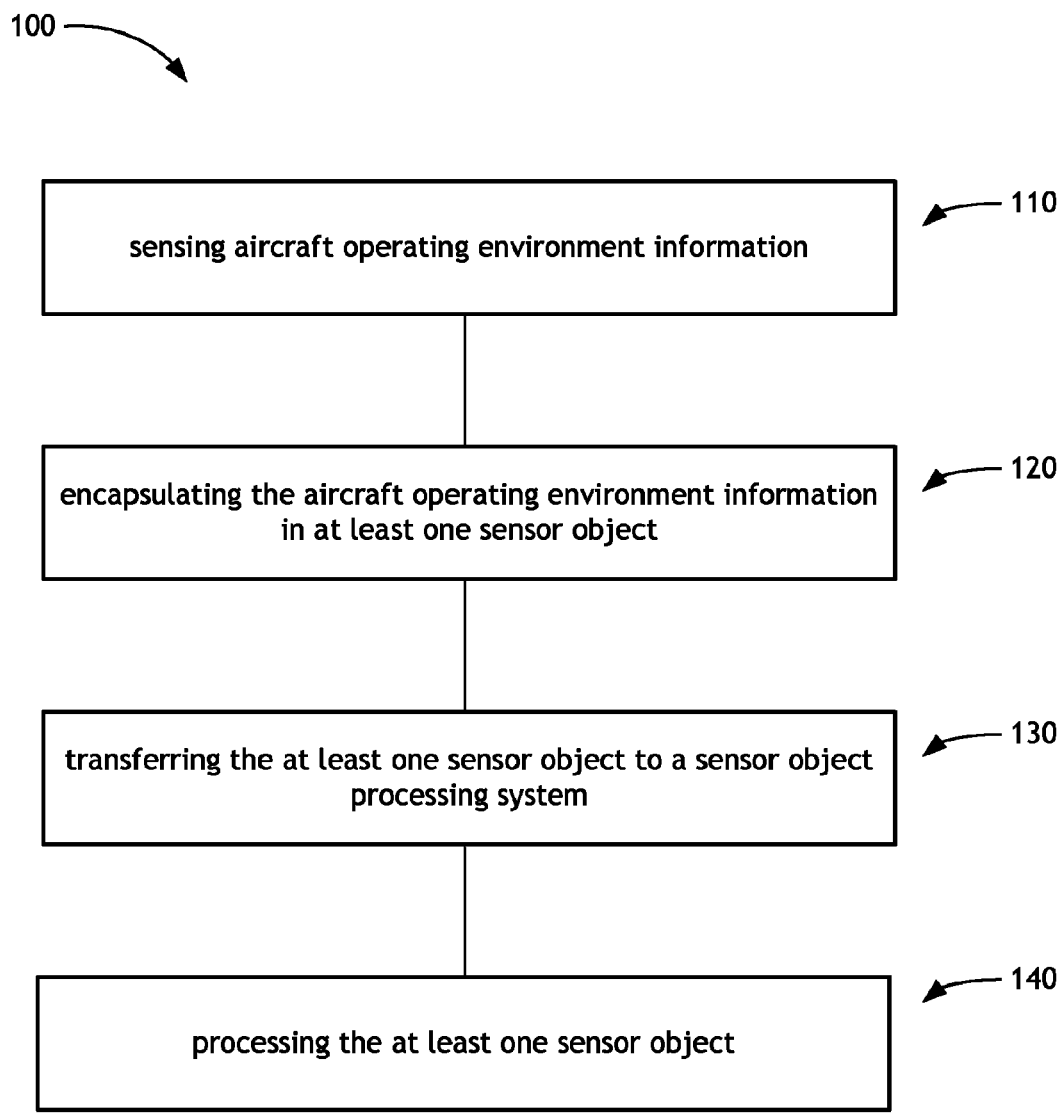
FIG. 1 is a flow diagram of a sensor data packaging and calculation in accordance with an embodiment of the present disclosure.
Figure 2:
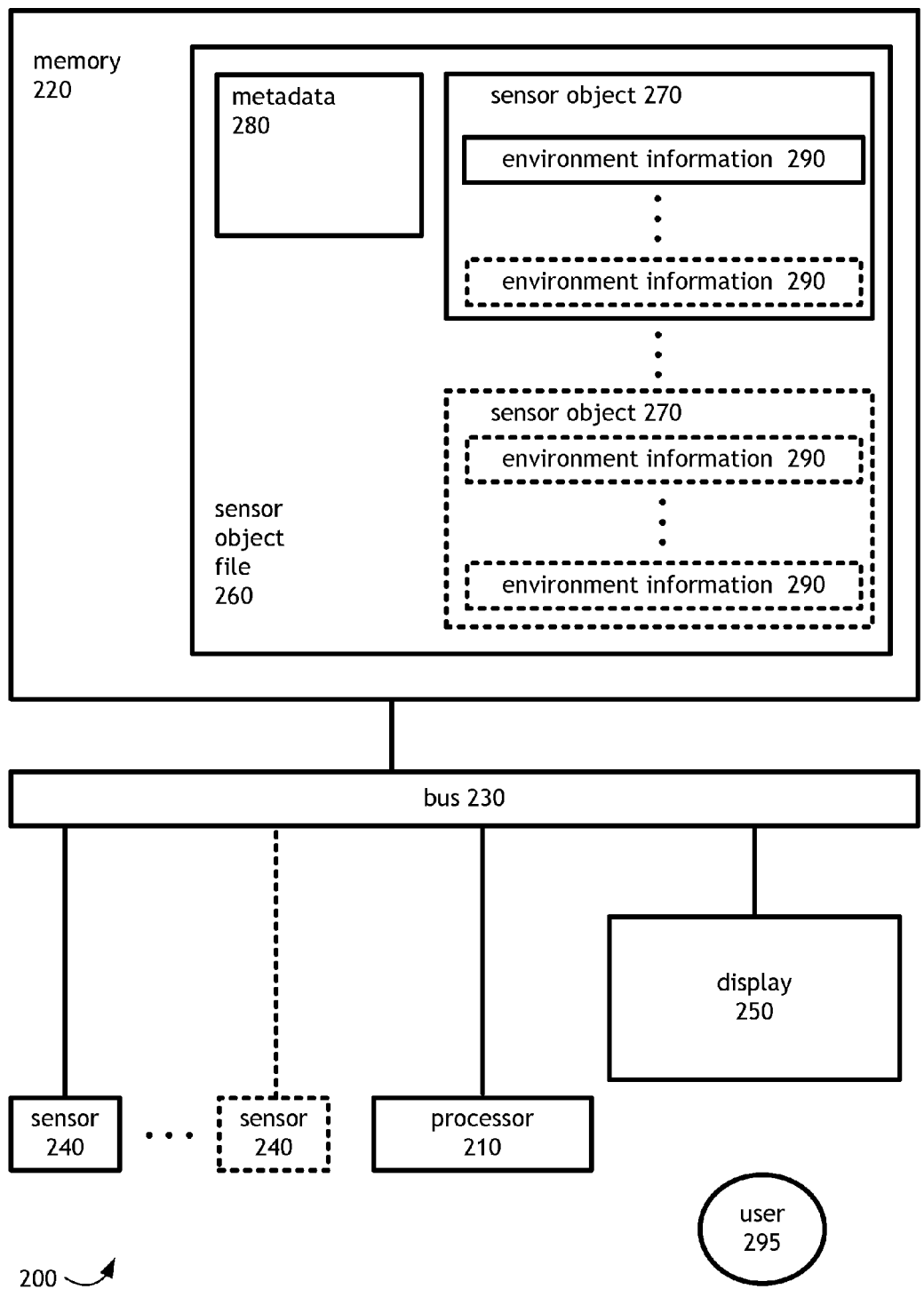
FIG. 2 is a block diagram of a sensor object processing system in accordance with an embodiment of the present disclosure.

Referring to FIG. 1, a method 100 for the processing of vehicle sensor data in accordance with an exemplary embodiment of the present invention is shown. For example, the vehicle sensor may be an aircraft sensor. However, the method described herein may be utilized in a variety of vehicles, including but not limited to land vehicles and aquatic vehicles.

In a current embodiment of the present disclosure, method 100 may include the step of sensing aircraft operating environment information 110. The electronic sensors of an aircraft may sense the aircraft operating environment information. Examples of the electronic sensors of an aircraft may include but are not limited to: traffic sensors, weather sensors, navigation sensors, terrain sensors, and communications sensors. Sensing may refer to active sensing which may include measuring or calculating. Sensing may refer to passive sensing which may include receiving information. For example, a traffic sensor may sense surrounding aircraft identity information, range to the surrounding aircraft information, range change rate to the surrounding aircraft information, altitude of the surrounding aircraft information, altitude change rate of the surrounding aircraft information, threat status of the surrounding aircraft information, and aircraft type of the surrounding aircraft information. The traffic sensor may sense extensive information of each individual aircraft operating in the vicinity of a user's aircraft.

In another example, a weather sensor may sense weather cell information. This weather cell information may include, for example, but not be limited to: weather cell location, weather cell intensity, weather cell turbulence level, a horizontal and a vertical extent for the weather cell, the hail content for the weather cell, and the growth or collapse of the weather cell.

In another example, a navigation sensor may sense information concerning the user's aircraft. This navigation information may include, for example, but not be limited to: position of user's aircraft, velocities of user's aircraft, and accelerations of user's aircraft.

In another example, a terrain sensor may sense information concerning nearby terrain. This terrain information may include, for example, but not be limited to: terrain elevation, terrain subtype (ex.: urban, suburban, rural, water), and aircraft threat risk.

In another example, a communications sensor may sense information concerning the communications status of user's aircraft. This communications information may include, for example, but not be limited to: an uplinked clearance of user's aircraft and a procedure definition for communications available to user's aircraft.

In exemplary embodiments, the method 100 may further include the step of encapsulating the aircraft operating environment information in at least one sensor object 120. A sensor object may contain all the information sensed by a particular sensor related to a single observed environmental item. A sensor object may be a data structure. Further, a sensor object may be created by the sensor that sensed the data contained in the sensor object. For example, a traffic object may be a type of sensor object containing all the data sensed by a traffic sensor related to a single surrounding aircraft. In another example, a weather object may be a type of sensor object containing all the data sensed by a weather sensor related to a single weather cell. A sensor may encapsulate the received aircraft operating environment information from a single aircraft operating environment item or from multiple aircraft operating environment items. Encapsulating the aircraft operating environment information in at least one sensor object may include converting non-numeric aircraft operating environment information to numeric values. Further, encapsulating the aircraft operating environment information in at least one sensor object may include converting all non-numeric aircraft operating environment information to numeric values. Sensor objects may be a class of data items with subtypes including, but not limited to, for example, traffic objects and weather objects. Sensor objects may be implemented in an object oriented data architecture.

In exemplary embodiments, the method 100 may further include the step of transferring the at least one sensor object to a sensor object processing system 130. A sensor object processing system may be a system for performing calculations on sensor object data. These calculations may include performing mathematical operations, decapsulating of sensor object data, and data management operations. For example, sensor object processing system 130 may be a flight deck system located in the sensor aircraft. In another embodiment, sensor object processing system 130 may be a system located in a land-based stationary facility. Transferring the at least one sensor object may include transferring a list of all the sensor objects from a particular electronic sensor. A sensor object file may include a list of all the sensor objects from a particular electronic sensor. A sensor object file may include metadata describing the data being transferred in the sensor objects. This metadata may include information to assist processing of the sensor object data. A particular sensor may transfer at least one sensor object several times. A particular sensor may transfer at least one sensor object at regular intervals.

In exemplary embodiments, the method 100 may further include the step of processing the at least one sensor object 140. Processing the at least one sensor object may include simultaneous processing of sensor object data from multiple sensors. Processing the at least one sensor object may include processing of sensor object data from multiple vehicles. Processing the at least one sensor object may be facilitated via the numeric format of the sensor object data. Processing the at least one sensor object may include performing calculations on sensor object data. Performing calculations may include performing mathematical operations, de-capsulating of sensor object data, and data management operations. Processing of the sensor object data may include transmitting the sensor object data. Transmitting the sensor object data may include transmitting from the aircraft to other land, aircraft, or aquatic vehicles. Transmitting the sensor object data may include transmitting from the aircraft to land based stationary facilities or satellites. Further processing of the sensor object data may occur at a location other than the aircraft. Processing of the sensor object data may enhance situational awareness. Processing of the sensor object data may include meteorological forecasting.

It is further contemplated that processing the at least one sensor object 140 may include calculating a trajectory solution for a vehicle. For example, a two dimensional trajectory solution may be a trajectory solution directing the latitude and longitude of a vehicle. Alternatively, the trajectory solution may be a three dimensional trajectory solution. The three dimensional trajectory solution may direct the latitude, longitude, and altitude of a vehicle. It is further contemplated the trajectory solution may be a four dimensional trajectory solution.

For the purposes of this disclosure, a four dimensional trajectory solution indicates the trajectory solution includes the passage of time as well as the three spatial dimensions. For example, an aircraft may have a particular destination. However, a weather cell may be located directly in the path between the aircraft and the destination. However, the four dimensional trajectory solution for the aircraft may not be required to divert around the weather cell if the weather cell will not be at its current location at the time the aircraft reaches the current location of the weather cell. A flight deck system may calculate the four dimensional trajectory solution through airspace. Sensor objects may be utilized to calculate the four dimension trajectory solution through airspace. An alternative three dimensional trajectory solution may involve the passage of time as well as latitude and longitude.

In exemplary embodiments, the method 100 may further include the step of presenting the trajectory solution to a user. A sensor object processing system may present the trajectory solution to the user. For example, the trajectory solution may be presented on a display. The display may be a flight deck system display. In another example, the trajectory solution may be presented via audio instructions or audio cues. The method 100 may further include the step of presenting the sensor object data to a user. Further, the method 100 may further include the step of presenting the processed sensor object data to a user.

Sensor object processing system 200 may perform the method 100 according to an embodiment of the present disclosure. Sensor object processing system 200 may contain a plurality of electronic sensors 240 for sensing aircraft operating environment information. In another embodiment, plurality of electronic sensors 240 may be remotely located from sensor object processing system 200. Each electronic sensor 240 may encapsulate aircraft operating environment information 290 in sensor object 270. Each electronic sensor 240 may encapsulate sensor object 270 for each aircraft operating environment item it senses. Sensor object 270 may include aircraft operating environment information 290 for each parameter an electronic sensor 240 senses. Electronic sensor 240 may encapsulate sensor objects 270 in sensor object file 260. Electronic sensor 240 may include metadata 280 in sensor object file 260 to describe the aircraft operating environment information 290 encapsulated in sensor object 270. Electronic sensor 240 may convert non-numeric operating environment information 290 into numerical format during the encapsulation process.

Processor 210 may load sensor object file 260 into memory 220. Sensor object file 260 may be loaded into memory 220 at regular time intervals. Processor 210 may utilize sensor object file 260 to calculate flight information. The flight information may include a trajectory solution. In an embodiment of the present disclosure, the flight information may be presented to user 295 on display 250. Display 250 may be communicatively coupled to processor 210, memory 220, and sensors 240 via bus 230. For example, display 250 may be a flight deck system display.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method, implemented as a set of instructions stored in memory and executed by a processing unit, comprising:
    sensing aircraft operating environment information including weather data pertaining to the aircraft;
    encapsulating the aircraft operating environment information in at least one sensor object;
    including traffic data in the at least one sensor object, wherein the traffic data includes surrounding aircraft identity information, range to the surrounding aircraft information, range change rate to the surrounding aircraft information, altitude of the surrounding aircraft information, altitude change rate of the surrounding aircraft information, threat status of the surrounding aircraft information, and aircraft type of the surrounding aircraft information;
    processing the at least one sensor object;
    calculating a four-dimensional trajectory solution for the aircraft over time to determine a path between the aircraft and a destination taking the weather data into consideration; and
    presenting the trajectory solution to a user.

2. The method of claim 1, wherein the at least one sensor object processing system is located remotely from the aircraft.

3. The method of claim 1, wherein the step of presenting the trajectory solution to the user comprises displaying the trajectory solution on a flight deck system display.

4. The method of claim 1, wherein the step of presenting the trajectory solution to the user comprises audio instructions or audio cues.

5. The method of claim 1, wherein the weather data includes weather cell location, weather cell intensity, weather cell turbulence level, a horizontal and a vertical extent for the weather cell, hail content for the weather cell, and growth or collapse of the weather cell.

6. The method of claim 1, further comprising the steps of obtaining meta data describing the aircraft operating environment information and including the meta data in the at least one sensor object.

7. The method of claim 1, further comprising the step of including navigation data in the at least one sensor object, wherein the navigation data includes position, velocity, and acceleration of the aircraft.

8. The method of claim 2, wherein the remote location comprises a second vehicle, a land based stationary facility, or a satellite.

9. The method of claim 1, wherein the step of calculating the four-dimensional trajectory for the aircraft further comprises the steps of:
    determining that a weather cell is located in the path between the aircraft and the destination at the time the aircraft reaches the weather cell; and
    recalculating the trajectory solution to divert the aircraft around the weather cell.

10. The method of claim 1, wherein the step of calculating the four-dimensional trajectory for the aircraft further comprises the steps of:
    determining that a weather cell is presently located in the path between the aircraft and the destination; and
    determining the weather cell will not be located in the path between the aircraft and the destination at the time the aircraft reaches the weather cell.

11. The method of claim 1, further comprising the step of including terrain data in the at least one sensor object, the terrain data comprising terrain elevation, terrain type, and aircraft threat risk.

12. The method of claim 1, further comprising the step of including communication data in the at least one sensor object, the communication data comprising uplinked clearance for the aircraft and a procedure definition for communications available to the aircraft.

13. A method, implemented as a set of instructions stored in memory and executed by a processing unit, comprising:
    sensing aircraft operating environment information;
    wherein the operating environment information comprises navigation data including position, velocity, and acceleration of the aircraft;
    wherein the operating environment information further comprises terrain data including terrain elevation, terrain type, and aircraft threat risk;
    wherein the operating environment information further comprises traffic data including surrounding aircraft identity information, range to the surrounding aircraft information, range change rate to the surrounding aircraft information, altitude of the surrounding aircraft information, altitude change rate of the surrounding aircraft information, threat status of the surrounding aircraft information, and aircraft type of the surrounding aircraft information;
    obtaining meta data describing the operating environment information;

encapsulating the aircraft operating environment information and the meta data in at least one sensor object;

processing the at least one sensor object; and presenting the operating environment information to a user.

14. The method of claim 13, further comprising the step of including communication data in the at least one sensor object, wherein the communication data comprises uplinked clearance for the aircraft and a procedure definition for communications available to the aircraft.

15. The method of claim 13, further comprising the step of including weather data in the at least one sensor object, wherein the weather data comprises weather cell location, weather cell intensity, weather cell turbulence level, a horizontal and a vertical extent for the weather cell, hail content for the weather cell, and growth or collapse of the weather cell.

16. A method, implemented as a set of instructions stored in memory and executed by a processing unit, comprising:

sensing aircraft operating environment information;

wherein the operating environment information comprises weather data including weather cell location, weather cell intensity, weather cell turbulence level, a horizontal and a vertical extent for the weather cell, hail content for the weather cell, and growth or collapse of the weather cell;

wherein the operating environment information further comprises communication data including uplinked clearance of user's aircraft and a procedure definition for communications available to user's aircraft;

wherein the operating environment information comprises navigation data including position, velocity, and acceleration of the aircraft;

wherein the operating environment information further comprises traffic data including surrounding aircraft identity information, range to the surrounding aircraft information, range change rate to the surrounding aircraft information, altitude of the surrounding aircraft information, altitude change rate of the surrounding aircraft information, threat status of the surrounding aircraft information, and aircraft type of the surrounding aircraft information;

wherein the operating environment information further comprises terrain data terrain elevation, terrain subtype, and aircraft threat risk;

obtaining meta data describing the operating environment information;

encapsulating the aircraft operating environment information and the meta data in at least one sensor object;

processing the at least one sensor object; and presenting the operating environment information to a user.

17. The method of claim 16, further comprising the steps of:

calculating a four-dimensional trajectory solution for the aircraft over time to determine a path between the aircraft and a destination taking the weather cell into consideration;

determining that the weather cell may be located in the path between the aircraft and the destination when the aircraft reaches the weather cell;

recalculating the trajectory to divert the aircraft around the weather cell; and presenting the recalculated trajectory solution to a user.

18. The method of claim 16, further comprising the steps of:

calculating a four-dimensional trajectory solution for the aircraft over time to determine a path between the aircraft and a destination taking the weather cell into consideration;

determining that the weather cell is presently located in the path between the aircraft and the destination;

determining that the weather cell will not be located in the path between the aircraft and the destination at the time the aircraft reaches the weather cell; and presenting the trajectory solution to a user.

* * * * *